(12) United States Patent
Bishara et al.

(10) Patent No.: US 7,826,447 B1
(45) Date of Patent: Nov. 2, 2010

(54) PREVENTING DENIAL-OF-SERVICE ATTACKS EMPLOYING BROADCAST PACKETS

(75) Inventors: Nafea Bishara, San Jose, CA (US); Tsahi Daniel, Tel-Aviv (IL); David Melman, D.N. Bikat Beit Hakerem (IL); Nir Arad, Nesher (IL)

(73) Assignees: Marvell International Ltd., Hamilton (BM); Marvell Israel (M.I.S.L.) Ltd., Yokneam (IL)

( * ) Notice: Subject to any disclaimer, the term of this patent is extended or adjusted under 35 U.S.C. 154(b) by 922 days.

(21) Appl. No.: 11/196,961

(22) Filed: Aug. 4, 2005

Related U.S. Application Data (60) Provisional application No. 60/693,245, filed on Jun. 22, 2005.

(51) Int. Cl.
*H04L 12/28* (2006.01)
*H04L 12/56* (2006.01)

(52) U.S. Cl. .................. 370/389; 370/216; 370/431

(58) Field of Classification Search ............... 370/392, 370/395.53, 389; 726/13
See application file for complete search history.

(56) References Cited

U.S. PATENT DOCUMENTS

| | | | |
|---|---|---|---|
| 7,032,031 B2* | 4/2006 | Jungck et al. | 709/246 |
| 2003/0174711 A1* | 9/2003 | Shankar | 370/395.53 |
| 2003/0236999 A1* | 12/2003 | Brustoloni | 713/201 |
| 2004/0078485 A1* | 4/2004 | Narayanan | 709/242 |
| 2004/0109452 A1* | 6/2004 | Takihiro et al. | 370/392 |
| 2005/0198519 A1* | 9/2005 | Tamura et al. | 713/188 |
| 2006/0080733 A1* | 4/2006 | Khosmood et al. | 726/13 |

* cited by examiner

*Primary Examiner*—Brian A Zimmerman
*Assistant Examiner*—Frederick Ott (57) ABSTRACT

An apparatus having a corresponding method and computer program comprises a processor; a plurality of ports to transmit and receive packets of data, the plurality of ports comprising a processor port in communication with the processor, the packets comprising broadcast packets and multicast packets; a memory to store a table that associates the processor port with one or more Internet protocol (IP) addresses; and a forwarding engine to transfer the packets between the ports, to transfer each of the broadcast packets to the processor port only when the table associates a target IP address of the broadcast packet with the processor port, and to transfer each of the multicast packets to the processor port only when the table associates a target IP address of the multicast packet with the processor port.

36 Claims, 4 Drawing Sheets

PREVENTING DENIAL-OF-SERVICE ATTACKS EMPLOYING BROADCAST PACKETS

CROSS-REFERENCE TO RELATED APPLICATIONS

This application claims the benefit of U.S. Provisional Patent Application Ser. No. 60/693,245 entitled "Preventing Denial-Of-Service Attacks Employing Address Resolution Protocol Packets," filed Jun. 22, 2005, the disclosure thereof incorporated by reference herein in its entirety.

BACKGROUND

The present invention relates generally to data communications. More particularly, the present invention relates to preventing denial-of-service attacks employing broadcast packets.

SUMMARY

In general, in one aspect, the invention features an apparatus comprising a processor; a plurality of ports to transmit and receive packets of data, the plurality of ports comprising a processor port in communication with the processor, the packets comprising broadcast packets and multicast packets; a memory to store a table that associates the processor port with one or more Internet protocol (IP) addresses; and a forwarding engine to transfer the packets between the ports, to transfer each of the broadcast packets to the processor port only when the table associates a target IP address of the broadcast packet with the processor port, and to transfer each of the multicast packets to the processor port only when the table associates a target IP address of the multicast packet with the processor port.

In some embodiments, the forwarding engine floods each of the broadcast packets to a virtual local area network (VLAN) associated with the broadcast packet, except for the processor port, when the table does not associate a target IP address of the broadcast packet with the processor port; and wherein the forwarding engine floods each of the multicast packets to a VLAN associated with the multicast packet, except for the processor port, when the table does not associate a target IP address of the multicast packet with the processor port. In some embodiments, the forwarding engine transfers the broadcast and multicast packets to the processor port only when the broadcast and multicast packets are control packets that conform to one of a predetermined set of control protocols. In some embodiments, the predetermined set of control protocols comprises: address resolution protocol (ARP); dynamic host configuration protocol (DHCP); and broadcast protocols running User Datagram Protocol (UDP) over IP broadcast. Some embodiments comprise a data link layer switch comprising the apparatus. Some embodiments comprise a multi-layer switch comprising the apparatus. Some embodiments comprise a router comprising the apparatus. In some embodiments, the broadcast packets comprises address resolution protocol (ARP) request packets; wherein each ARP request packet is associated with one of a plurality of virtual local area networks (VLAN); wherein the table associates the processor port with one of the VLANs; and wherein the forwarding engine transfers each of the ARP request packets to the processor port only when the table associates the processor port with the target IP address of the ARP request packet and the VLAN associated with the ARP request packet. In some embodiments, the forwarding engine transfers the broadcast and multicast packets to the processor port only when the broadcast and multicast packets are control packets that conform to one of a predetermined set of control protocols. In some embodiments, the broadcast packets comprises address resolution protocol (ARP) request packets; wherein the table associates each of the ports with one or more IP addresses; wherein the forwarding engine transfers the packets between the ports according to the table and the destination IP addresses of the packets; and wherein the forwarding engine transfers the ARP request packets to the processor port only when the table associates the target IP address of the ARP request packet with the processor port. In some embodiments, the forwarding engine transfers the broadcast and multicast packets to the processor port only when the broadcast and multicast packets are control packets that conform to one of a predetermined set of control protocols. In some embodiments, the broadcast packets comprises address resolution protocol (ARP) request packets; wherein the table associates each of the ports with one or more IP addresses; wherein the forwarding engine transfers the packets between the ports according to the table and the destination IP addresses of the packets; and wherein the forwarding engine transfers the ARP request packets to one of the ports only when the table associates the target IP address of the ARP request packet with the one of the ports. In some embodiments, the forwarding engine transfers the broadcast and multicast packets to the processor port only when the broadcast and multicast packets are control packets that conform to one of a predetermined set of control protocols.

In general, in one aspect, the invention features a method for an apparatus comprising a processor and a plurality of ports to transmit and receive packets of data, the plurality of ports comprising a processor port in communication with the processor, the method comprising: receiving broadcast packets and multicast packets; storing a table that associates the processor port with one or more Internet protocol (IP) addresses; transferring each of the broadcast packets to the processor port only when the table associates the target IP address of the broadcast packet with the processor port; and transferring each of the multicast packets to the processor port only when the table associates the target IP address of the multicast packet with the processor port.

Some embodiments comprise flooding each of the broadcast packets to a virtual local area network (VLAN) associated with the broadcast packet, except for the processor port, when the table does not associate a target IP address of the broadcast packet with the processor port; and flooding each of the multicast packets to a VLAN associated with the multicast packet, except for the processor port, when the table does not associate a target IP address of the multicast packet with the processor port. In some embodiments, the broadcast and multicast packets are transferred to the processor port only when the broadcast and multicast packets are control packets that conform to one of a predetermined set of control protocols. In some embodiments, the predetermined set of control protocols comprises: address resolution protocol (ARP); dynamic host configuration protocol (DHCP); and broadcast protocols running User Datagram Protocol (UDP) over IP broadcast. In some embodiments, the apparatus is selected from the group consisting of: a data link layer switch; a multi-layer switch; and a router. In some embodiments, the broadcast packets comprises address resolution protocol (ARP) request packets; wherein each ARP request packet is associated with one of a plurality of virtual local area networks (VLAN); wherein the table associates the processor port with one of the VLANs; and wherein each of the ARP request packets is transferred to the processor port only when the table associates the processor port with the target IP address of the ARP request packet and the VLAN associated with the ARP request packet. In some embodiments, the broadcast and multicast packets are transferred to the processor port only when the broadcast and multicast packets are control packets that conform to one of a predetermined set of control protocols. In some embodiments, the apparatus is selected from the group consisting of: a data link layer switch; a multi-layer switch; and a router. In some embodiments, the table associates each of the ports with one or more IP addresses, and wherein the broadcast packets comprises address resolution protocol (ARP) request packets, further comprising: transferring the packets between the ports according to the table and the destination IP addresses of the packets; wherein the ARP request packets are transferred to the processor port only when the table associates the target IP address of the ARP request packet with the processor port. In some embodiments, the broadcast and multicast packets are transferred to the processor port only when the broadcast and multicast packets are control packets that conform to one of a predetermined set of control protocols. In some embodiments, the table associates each of the ports with one or more IP addresses, and wherein the broadcast packets comprises address resolution protocol (ARP) request packets, further comprising: transferring the packets between the ports according to the table and the destination IP addresses of the packets; and wherein the ARP request packets are transferred to one of the ports only when the table associates the target IP address of the ARP request packet with the one of the ports. In some embodiments, the broadcast and multicast packets are transferred to the processor port only when the broadcast and multicast packets are control packets that conform to one of a predetermined set of control protocols.

In general, in one aspect, the invention features an apparatus comprising: means for processing; a plurality of port means for transmitting and receiving packets of data, the plurality of port means comprising processor port means in communication with the means for processing, the packets comprising broadcast packets and multicast packets; means for storing a table that associates the processor port means with one or more Internet protocol (IP) addresses; and means for transferring the packets between the port means, for transferring each of the broadcast packets to the processor port means only when the table associates a target IP address of the broadcast packet with the processor port means, and for transferring each of the multicast packets to the processor port means only when the table associates a target IP address of the multicast packet with the processor port means.

In some embodiments, the means for transferring floods each of the broadcast packets to a virtual local area network (VLAN) associated with the broadcast packet, except for the processor port means, when the table does not associate a target IP address of the broadcast packet with the processor port means; and wherein the means for transferring floods each of the multicast packets to a VLAN associated with the multicast packet, except for the processor port means, when the table does not associate a target IP address of the multicast packet with the processor port means. In some embodiments, the means for transferring transfers the broadcast and multicast packets to the processor port means only when the broadcast and multicast packets are control packets that conform to one of a predetermined set of control protocols. In some embodiments, the predetermined set of control protocols comprises: address resolution protocol (ARP); dynamic host configuration protocol (DHCP); and broadcast protocols running User Datagram Protocol (UDP) over IP broadcast. Some embodiments comprise a data link layer switch comprising the apparatus. Some embodiments comprise a multi-layer switch comprising the apparatus. Some embodiments comprise a router comprising the apparatus. In some embodiments, the broadcast packets comprises address resolution protocol (ARP) request packets; wherein each ARP request packet is associated with one of a plurality of virtual local area networks (VLAN); wherein the table associates the processor port means with one of the VLANs; and wherein the means for transferring transfers each of the ARP request packets to the processor port means only when the table associates the processor port means with the target IP address of the ARP request packet and the VLAN associated with the ARP request packet. In some embodiments, the means for transferring transfers the broadcast and multicast packets to the processor port means only when the broadcast and multicast packets are control packets that conform to one of a predetermined set of control protocols. In some embodiments, the broadcast packets comprises address resolution protocol (ARP) request packets; wherein the table associates each of the port means with one or more IP addresses; wherein the means for transferring engine transfers the packets between the port means according to the table and the destination IP addresses of the packets; and wherein the means for transferring transfers the ARP request packets to the processor port means only when the table associates the target IP address of the ARP request packet with the processor port means. In some embodiments, the means for transferring transfers the broadcast and multicast packets to the processor port means only when the broadcast and multicast packets are control packets that conform to one of a predetermined set of control protocols. In some embodiments, the broadcast packets comprises address resolution protocol (ARP) request packets; wherein the table associates each of the port means with one or more IP addresses; wherein the means for transferring transfers the packets between the port means according to the table and the destination IP addresses of the packets; and wherein the means for transferring transfers the ARP request packets to one of the port means only when the table associates the target IP address of the ARP request packet with the one of the port means. In some embodiments, the means for transferring transfers the broadcast and multicast packets to the processor port means only when the broadcast and multicast packets are control packets that conform to one of a predetermined set of control protocols.

In general, in one aspect, the invention features a computer program for an apparatus comprising a processor and a plurality of ports to transmit and receive packets of data comprising broadcast packets and multicast packets, the plurality of ports comprising a processor port in communication with the processor, the computer program comprising: storing a table that associates the processor port with one or more Internet protocol (IP) addresses; causing the apparatus to transfer each of the broadcast packets to the processor port only when the table associates the target IP address of the broadcast packet with the processor port; and causing the apparatus to transfer each of the multicast packets to the processor port only when the table associates the target IP address of the multicast packet with the processor port.

Some embodiments comprise causing the apparatus to flood each of the broadcast packets to a virtual local area network (VLAN) associated with the broadcast packet, except for the processor port, when the table does not associate a target IP address of the broadcast packet with the processor port; and causing the apparatus to flood each of the multicast packets to a VLAN associated with the multicast packet, except for the processor port, when the table does not associate a target IP address of the multicast packet with the processor port. In some embodiments, the broadcast and multicast packets are transferred to the processor port only when the broadcast and multicast packets are control packets that conform to one of a predetermined set of control protocols. In some embodiments, the predetermined set of control protocols comprises: address resolution protocol (ARP); dynamic host configuration protocol (DHCP); and broadcast protocols running User Datagram Protocol (UDP) over IP broadcast. In some embodiments, the apparatus is selected from the group consisting of: a data link layer switch; a multi-layer switch; and a router. In some embodiments, the broadcast packets comprises address resolution protocol (ARP) request packets; wherein each ARP request packet is associated with one of a plurality of virtual local area networks (VLAN); wherein the table associates the processor port with one of the VLANs; and wherein each of the ARP request packets is transferred to the processor port only when the table associates the processor port with the target IP address of the ARP request packet and the VLAN associated with the ARP request packet. In some embodiments, the broadcast and multicast packets are transferred to the processor port only when the broadcast and multicast packets are control packets that conform to one of a predetermined set of control protocols. In some embodiments, the table associates each of the ports with one or more IP addresses, and wherein the broadcast packets comprises address resolution protocol (ARP) request packets, further comprising: causing the apparatus to transfer the packets between the ports according to the table and the destination IP addresses of the packets; wherein the ARP request packets are transferred to the processor port only when the table associates the target IP address of the ARP request packet with the processor port. In some embodiments, the broadcast and multicast packets are transferred to the processor port only when the broadcast and multicast packets are control packets that conform to one of a predetermined set of control protocols. In some embodiments, the table associates each of the ports with one or more IP addresses, and wherein the broadcast packets comprises address resolution protocol (ARP) request packets, further comprising: causing the apparatus to transfer the packets between the ports according to the table and the destination IP addresses of the packets; and wherein the ARP request packets are transferred to one of the ports only when the table associates the target IP address of the ARP request packet with the one of the ports. In some embodiments, the broadcast and multicast packets are transferred to the processor port only when the broadcast and multicast packets are control packets that conform to one of a predetermined set of control protocols.

The details of one or more implementations are set forth in the accompanying drawings and the description below. Other features will be apparent from the description and drawings, and from the claims.

The leading digit(s) of each reference numeral used in this specification indicates the number of the drawing in which the reference numeral first appears.

DETAILED DESCRIPTION

Data communications networks are the subject of increasingly numerous and sophisticated attacks. One type of attack is the denial-of-service attack in which an attacker overwhelms the management/host processor of a network device such as a switch with a high volume of traffic, thereby preventing the processor from attending to other protocol processing and data flows. One type of denial-of-service attack employs multicast and broadcast packets such as address resolution protocol (ARP) packets. In conventional switches, ARP request packets are always flooded to all ports within the flood domain (virtual local area networks (VLAN)). The host management processor in the switch or a router interfaces with the rest of the network for the purpose of protocol exchanges and remote management. In order for the host processor to do so, the processor must have one or more IP addresses, and must belong to one or more VLANs in the network. Because the processor is a member of the VLAN, it receives broadcast packets in the VLAN such as ARP request packets. In such switches, the processor is exposed to broadcast packets such as ARP request packets. Therefore an attacker can mount a denial-of-service attack upon a network by simply transmitting a large number of ARP request packets to the network and thereby burdening the host processor.

Embodiments of the present invention prevent denial-of-service attacks employing broadcast and multicast packets. According to preferred embodiments, no broadcast packets are sent to the processor except control packets such as ARP packets and dynamic host configuration protocol (DHCP) packets. According to some embodiments, a device such as a switch passes broadcast and multicast packets to the processor only when the IP address of the processor is the target of the packet. According to some embodiments, the device passes ARP requests to the processor only when the processor has the IP address that is the target of the ARP request and belongs to the VLAN that is associated with the ARP request.

Figure 1:
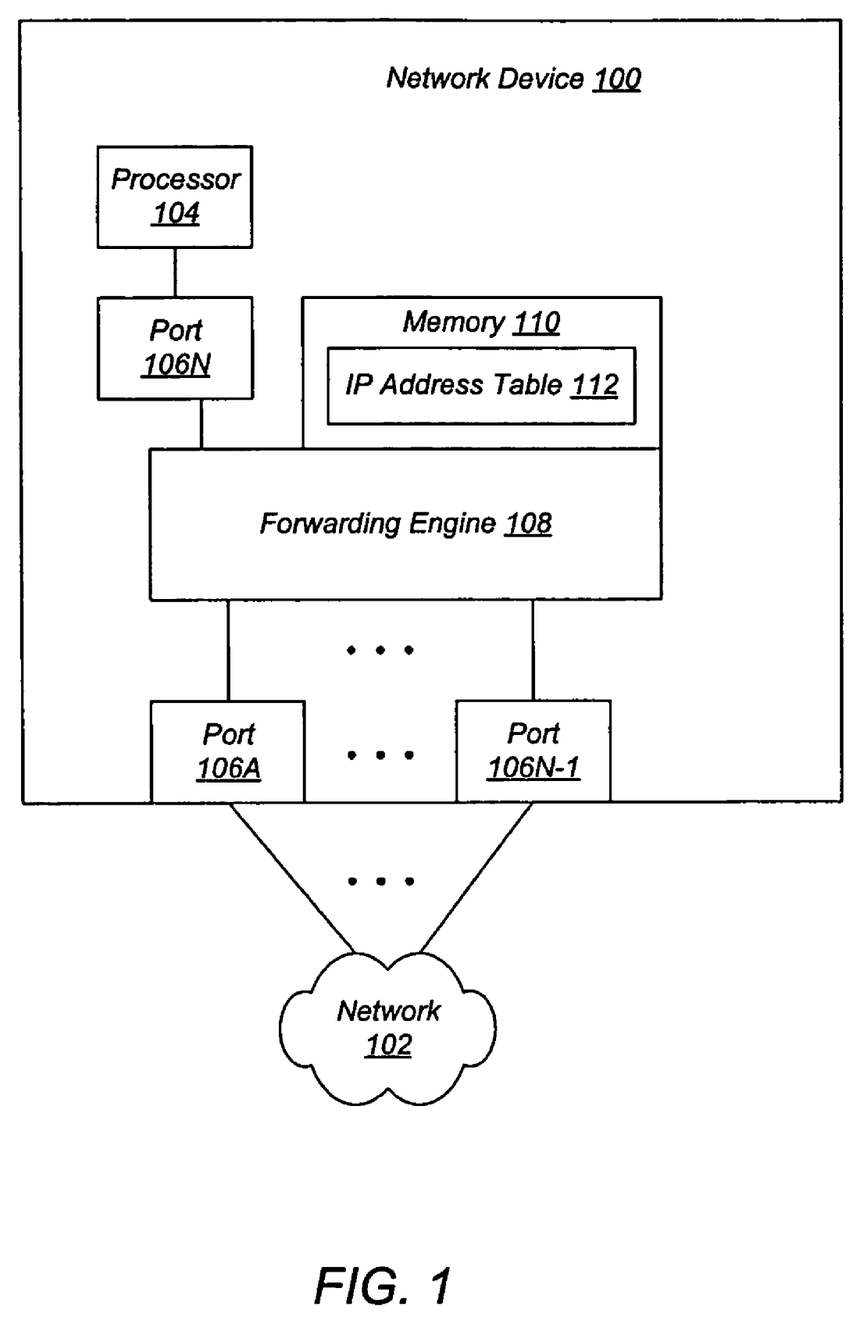
FIG. 1 shows a network device in communication with one or more networks according to a preferred embodiment.

FIG. 1 shows a network device 100 in communication with one or more networks 102 according to a preferred embodiment. Network device 100 comprises a processor 104, a plurality of ports 106A-N to transmit and receive packets of data, the plurality of ports comprising a processor port 106N in communication with processor 104, a forwarding engine 108 to transfer the packets between ports 106, and a memory 110 to store an IP address table 112. In various embodiments, network device 100 can be implemented as a data link layer switch, a multi-layer switch, a router, and the like.

Figure 2:
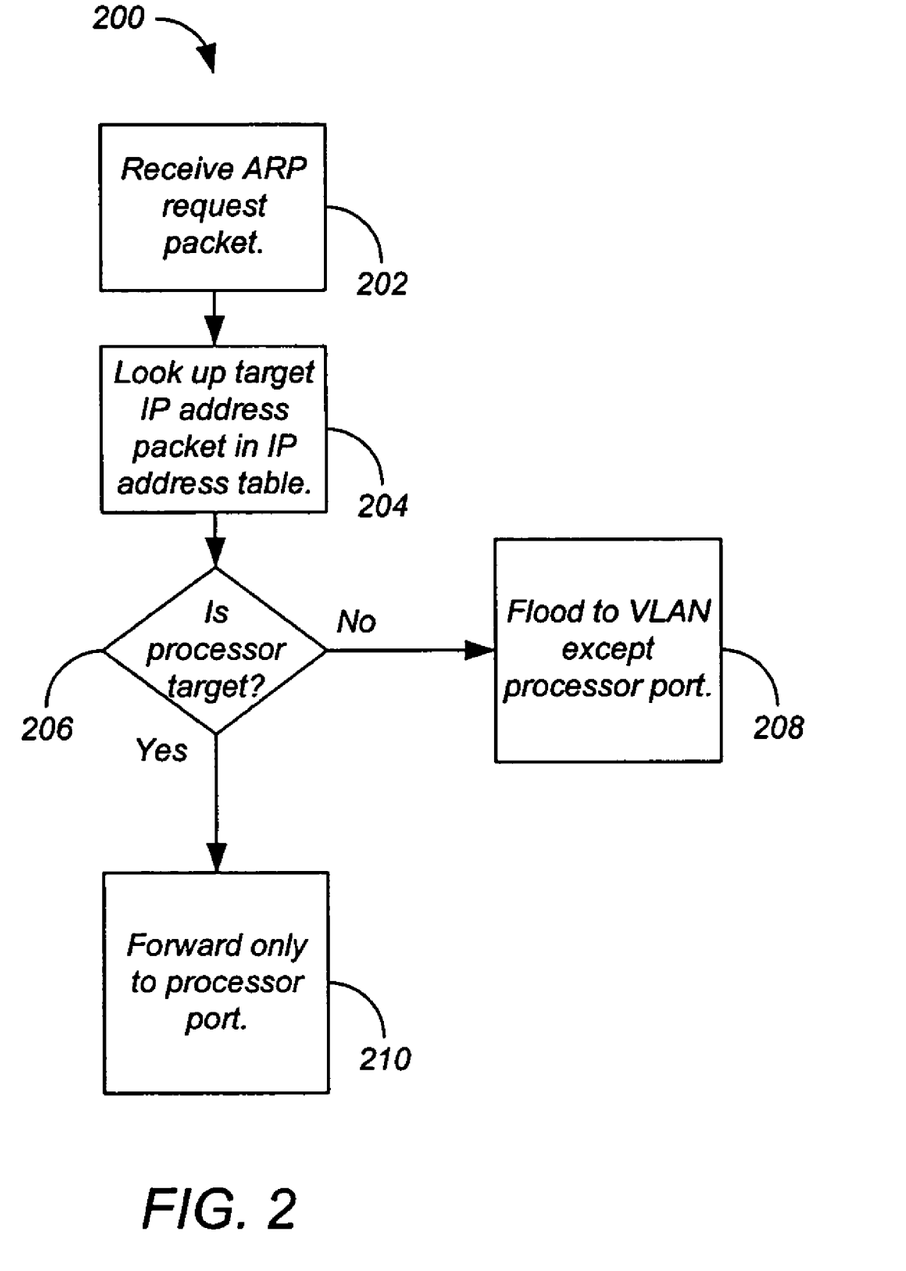
FIG. 2 shows a process for the network device of FIG. 1 for limiting access of ARP request packets to the processor using a dedicated IP address table according to a preferred embodiment.

FIG. 2 shows a process 200 for network device 100 of FIG. 1 for limiting access of ARP request packets to processor 104 using dedicated IP address table 112 according to a preferred embodiment. While embodiments of the present invention are described with reference to ARP packets, embodiments of the present invention apply to any broadcast or multicast packet, as will be apparent to one skilled in the relevant arts after reading this description. Network device 100 receives an ARP request packet (step 202). Each ARP request packet comprises a target IP address for which the corresponding media access control (MAC) address is sought, as is well-known in the relevant arts. ARP request packets are generally transmitted as broadcast or multicast packets. However, according to embodiments of the present invention, access to processor 104 by ARP request packets is limited by the techniques described below.

Forwarding engine 108 looks up the target IP address of the ARP request packet in IP address table 112 (step 204). Based on the lookup, forwarding engine 108 determines whether the ARP request packet is directed to processor 104 (step 206). In a data link layer switch IP address table 112 can be dedicated to limiting ARP floods. In devices having network layer capabilities, such as a multi-layer switch or router, the existing IP forwarding table can be used as table 112. If the IP address of processor port 106N is the same as the target IP address of the ARP request packet, then processor 104 is the target of the ARP request packet, and forwarding engine 108 forwards the ARP request packet only to processor port 106N (step 210). Otherwise forwarding engine 108 floods the ARP request packet within the VLAN except to processor port 106N (step 208).

In some embodiments employing VLANs, ARP request packets are forwarded to processor 104 only when processor 104 is the target of the ARP request packet and the ARP request packet is associated with the same VLAN as processor 104. According to these embodiments, forwarding engine 108 optionally determines whether the ARP request packet is associated with the same VLAN as processor 104. In some embodiments, IP address table 112 associates processor port 106N with one or more VLANs. If the ARP request packet is not associated with the same VLAN as processor 104, forwarding engine 108 optionally removes processor port 106N from the destination port list of the ARP request packet. Finally, forwarding engine 108 floods the ARP request packet according to its destination port list.

Figure 3:
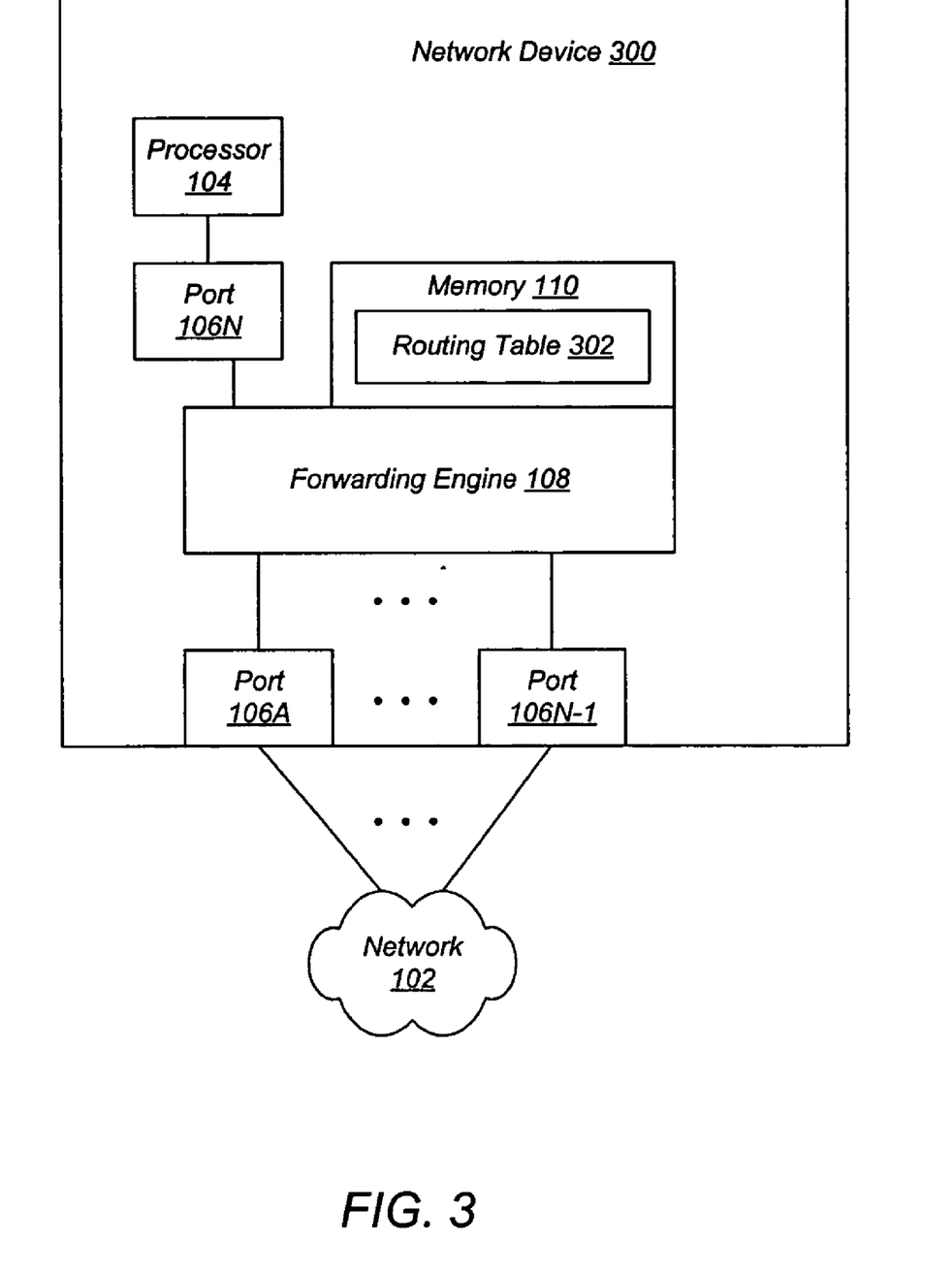
FIG. 3 shows a network device in communication with one or more networks according to a preferred embodiment.

FIG. 3 shows a network device 300 in communication with one or more networks 102 according to a preferred embodiment. Network device 300 comprises a processor 104, a plurality of ports 106A-N to transmit and receive packets of data, the plurality of ports comprising a processor port 106N in communication with processor 104, a forwarding engine 108 to transfer the packets between ports 106 according to a routing table 302, and a memory 110 to store routing table 302. In various embodiments, network device 300 can be implemented as a multi-layer switch, a router, and the like.

Figure 4:
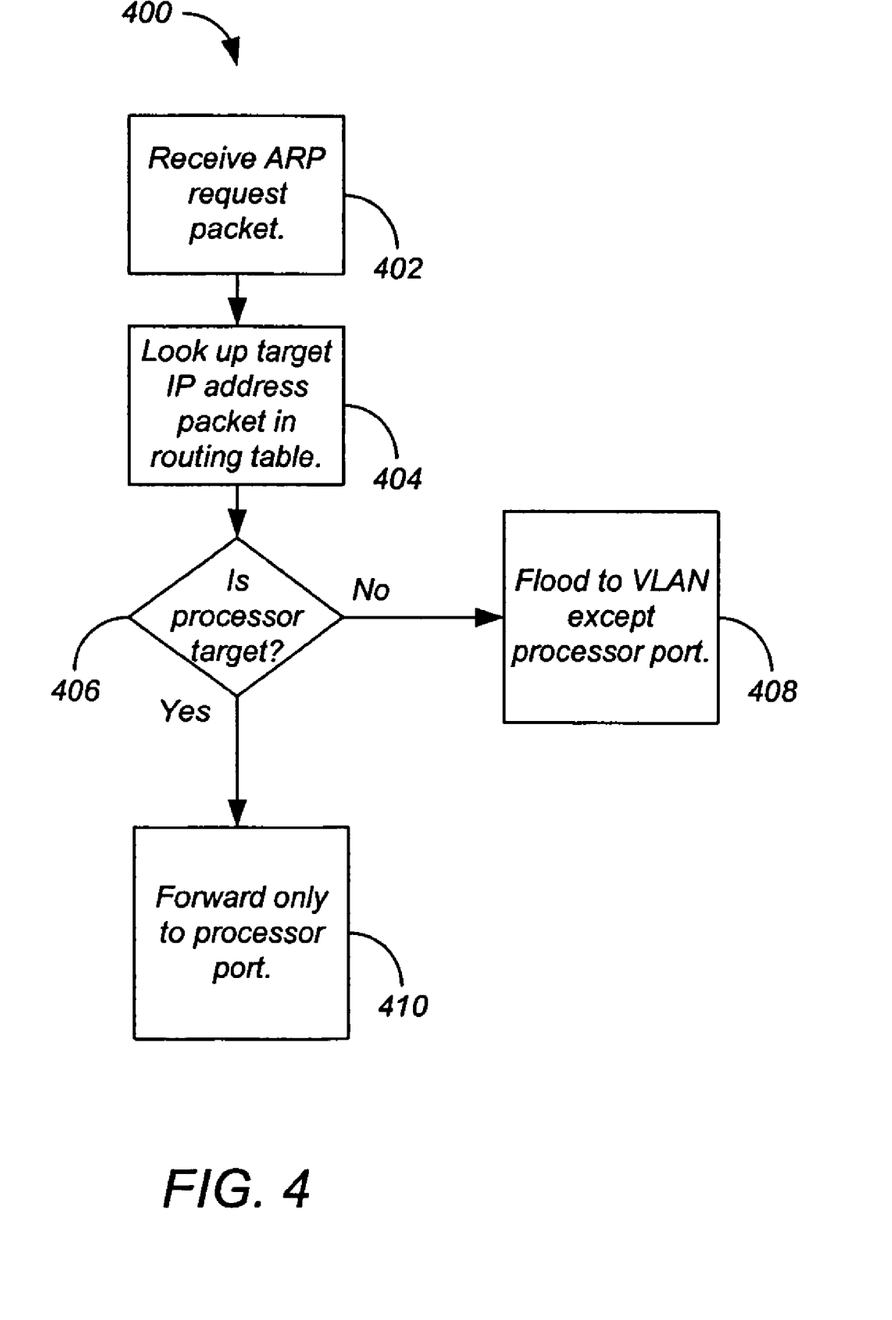
FIG. 4 shows a process for the network device of FIG. 3 for limiting access of ARP request packets to the processor using a routing table according to a preferred embodiment.

FIG. 4 shows a process 400 for network device 300 of FIG. 3 for limiting access of ARP request packets to processor 104 using routing table 302 according to a preferred embodiment. Network device 300 receives an ARP request packet (step 402). According to embodiments of the present invention, access to processor 104 by ARP request packets is limited by the techniques described below.

Forwarding engine 108 looks up the target IP address of the ARP request packet in routing table 302 (step 404). Forwarding engine 108 determines whether the ARP request packet is directed to processor 104 (step 406) according to routing table 302, which associates each of ports 106 with one or more IP addresses, as is well-known in the relevant arts. If the IP address of processor port 106N is the same as the target IP address of the ARP request packet, then processor 104 is the target of the ARP request packet, and forwarding engine 108 forwards the ARP request packet only to processor port 106N (step 410). Otherwise forwarding engine 108 floods the ARP request packet within the VLAN except to processor port 106N (step 408).

In some embodiments employing VLANs, ARP request packets are forwarded to processor 104 only when processor 104 is the target of the ARP request packet and the ARP request packet is associated with the same VLAN as processor 104. According to these embodiments, forwarding engine 108 optionally determines whether the ARP request packet is associated with the same VLAN as processor 104, for example using routing table 302. If the ARP request packet is not associated with the same VLAN as processor 104, forwarding engine 108 optionally removes processor port 106N from the destination port list of the ARP request packet. Finally, forwarding engine 108 floods the ARP request packet according to its destination port list.

Some embodiments provide additional protection against ARP-based denial-of-service attacks by applying the technique of FIG. 4 to all of the ports 106 of network device 300. That is, forwarding engine 108 transfers each ARP request packet only to the port 106 that is associated with the target IP address of the ARP request packet. In some embodiments, forwarding engine 108 transfers each ARP request packet only to the port 106 that is associated with the target IP address of the ARP request packet, and only when the VLANs associated with the port 106 and the ARP request packet are the same.

Embodiments of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. An apparatus comprising:
   a processor;
   a plurality of network ports to transmit and receive packets of data, the plurality of network ports comprising a processor port in communication with the processor, the packets comprising broadcast packets;
   a memory to store a table that associates the processor port with one or more Internet protocol (IP) addresses; and
   a forwarding engine to transfer the packets between the network ports and to transfer each of the broadcast packets to the processor via the processor port only when the table associates a target IP address in a payload of the broadcast packet with the processor port.

2. The apparatus of claim 1:
wherein the forwarding engine floods each of the broadcast packets to a virtual local area network (VLAN) associated with the broadcast packet, except for the processor port, when the table does not associate the target IP address in the payload of the broadcast packet with the processor port.

3. The apparatus of claim 1:
wherein the forwarding engine transfers the broadcast packets to the processor port only when the broadcast packets are control packets that conform to one of a predetermined set of control protocols.

4. The apparatus of claim 3, wherein the predetermined set of control protocols comprises:
address resolution protocol (ARP);
dynamic host configuration protocol (DHCP); and
broadcast protocols running User Datagram Protocol (UDP) over IP broadcast.

5. A data link layer switch comprising the apparatus of claim 1.

6. A multi-layer switch comprising the apparatus of claim 1.

7. A router comprising the apparatus of claim 1.

8. The apparatus of claim 1:
wherein the broadcast packets comprises address resolution protocol (ARP) request packets;
wherein each ARP request packet is associated with one of a plurality of virtual local area networks (VLAN);
wherein the table associates the processor port with one of the VLANs; and
wherein the forwarding engine transfers each of the ARP request packets to the processor port only when the table associates the processor port with the target IP address of the ARP request packet and the VLAN associated with the ARP request packet.

9. The apparatus of claim 8:
wherein the forwarding engine transfers the broadcast packets to the processor port only when the broadcast packets are control packets that conform to one of a predetermined set of control protocols.

10. A data link layer switch comprising the apparatus of claim 8.

11. A multi-layer switch comprising the apparatus of claim 8.

12. A router comprising the apparatus of claim 8.

13. The apparatus of claim 1:
wherein the broadcast packets comprises address resolution protocol (ARP) request packets;
wherein the table associates each of the network ports with one or more IP addresses;
wherein the forwarding engine transfers the packets between the network ports according to the table and destination IP addresses of the packets; and
wherein the forwarding engine transfers the ARP request packets to the processor port only when the table associates the target IP address of the ARP request packet with the processor port.

14. The apparatus of claim 13:
wherein the forwarding engine transfers the broadcast packets to the processor port only when the broadcast packets are control packets that conform to one of a predetermined set of control protocols.

15. A multi-layer switch comprising the apparatus of claim 13.

16. A router comprising the apparatus of claim 13.

17. The apparatus of claim 1:
wherein the broadcast packets comprises address resolution protocol (ARP) request packets;
wherein the table associates each of the network ports with one or more IP addresses;
wherein the forwarding engine transfers the packets between the network ports according to the table and destination IP addresses of the packets; and
wherein the forwarding engine transfers the ARP request packets to one of the network ports only when the table associates the target IP address of the ARP request packet with the one of the network ports.

18. The apparatus of claim 17:
wherein the forwarding engine transfers the broadcast packets to the processor port only when the broadcast packets are control packets that conform to one of a predetermined set of control protocols.

19. A multi-layer switch comprising the apparatus of claim 17.

20. A router comprising the apparatus of claim 17.

21. The apparatus of claim 1, wherein the processor is directly connected to the processor port and is indirectly connected to remaining ones of the plurality of ports.

22. A method for an apparatus comprising a processor and a plurality of network ports to transmit and receive packets of data, the plurality of network ports comprising a processor port in communication with the processor, the method comprising:
receiving broadcast packets;
storing a table that associates the processor port with one or more Internet protocol (IP) addresses; and
transferring each of the broadcast packets to the processor via the processor port only when the table associates a target IP address in a payload of the broadcast packet with the processor port.

23. The method of claim 22, further comprising:
flooding each of the broadcast packets to a virtual local area network (VLAN) associated with the broadcast packet, except for the processor port, when the table does not associate the target IP address in the payload of the broadcast packet with the processor port.

24. The method of claim 22:
wherein the broadcast packets are transferred to the processor port only when the broadcast packets are control packets that conform to one of a predetermined set of control protocols.

25. The method of claim 24, wherein the predetermined set of control protocols comprises:
address resolution protocol (ARP);
dynamic host configuration protocol (DHCP); and
broadcast protocols running User Datagram Protocol (UDP) over IP broadcast.

26. The method of claim 22, wherein the apparatus is selected from the group consisting of:
a data link layer switch;
a multi-layer switch; and
a router.

27. The method of claim 22:
wherein the broadcast packets comprises address resolution protocol (ARP) request packets;
wherein each ARP request packet is associated with one of a plurality of virtual local area networks (VLAN);
wherein the table associates the processor port with one of the VLANs; and
wherein each of the ARP request packets is transferred to the processor port only when the table associates the processor port with the target IP address of the ARP request packet and the VLAN associated with the ARP request packet.

28. The method of claim 27:
wherein the broadcast packets are transferred to the processor port only when the broadcast packets are control packets that conform to one of a predetermined set of control protocols.

29. The method of claim 27, wherein the apparatus is selected from the group consisting of:
a data link layer switch;
a multi-layer switch; and
a router.

30. The method of claim 22, wherein the table associates each of the network ports with one or more IP addresses, and wherein the broadcast packets comprises address resolution protocol (ARP) request packets, further comprising:
transferring the packets between the network ports according to the table and destination IP addresses of the packets;
wherein the ARP request packets are transferred to the processor port only when the table associates the target IP address of the ARP request packet with the processor port.

31. The method of claim 30:
wherein the broadcast packets are transferred to the processor port only when the broadcast packets are control packets that conform to one of a predetermined set of control protocols.

32. The method of claim 30, wherein the apparatus is selected from the group consisting of:
a multi-layer switch; and
a router.

33. The method of claim 22, wherein the table associates each of the network ports with one or more IP addresses, and wherein the broadcast packets comprises address resolution protocol (ARP) request packets, further comprising:
transferring the packets between the network ports according to the table and destination IP addresses of the packets; and
wherein the ARP request packets are transferred to one of the network ports only when the table associates the target IP address of the ARP request packet with the one of the ports.

34. The method of claim 33:
wherein the broadcast packets are transferred to the processor port only when the broadcast packets are control packets that conform to one of a predetermined set of control protocols.

35. The method of claim 33, wherein the apparatus is selected from the group consisting of:
a multi-layer switch; and
a router.

36. The method of claim 22, wherein the processor is directly connected to the processor port and is indirectly connected to remaining ones of the plurality of ports.

\* \* \* \* \*